United States Patent [19]
Kanatani et al.

[11] Patent Number: 5,473,339
[45] Date of Patent: Dec. 5, 1995

[54] LIQUID CRYSTAL PROJECTOR

[75] Inventors: Keiichi Kanatani, Hirakata; Shunichi Kishimoto, Kaizuka; Yasuo Funazo, Hirakata; Takashi Miwa, Higashiosaka; Kazuhiro Kono, Kadoma; Goro Hamagishi, Toyonaka; Kiyoshi Hosoi, Minoo; Shinji Shiogai, Hirakata; Koichi Fujiwara, Higashiosaka; Takao Matsumura, Ikoma; Shigeru Kobayashi, Hirakata; Shinichi Otsuki, Nara; Kenji Kaneko, Kobe, all of Japan

[73] Assignee: Sanyo Electric Co., Ltd., Osaka, Japan

[21] Appl. No.: 885,693

[22] Filed: May 19, 1992

Related U.S. Application Data

[63] Continuation of Ser. No. 554,761, Jul. 20, 1990, abandoned.

[30] Foreign Application Priority Data

| Jul. 20, 1989 | [JP] | Japan | 1-187813 |
| Jul. 20, 1989 | [JP] | Japan | 1-187814 |
| Aug. 11, 1989 | [JP] | Japan | 1-208108 |
| Aug. 17, 1989 | [JP] | Japan | 1-9708 |
| Aug. 17, 1989 | [JP] | Japan | 1-213417 |

[51] Int. Cl.$^6$ ............................................. H04N 9/30
[52] U.S. Cl. ................................................. 345/87; 345/4
[58] Field of Search ............................. 353/34, 30, 31; 345/4, 87

[56] References Cited

U.S. PATENT DOCUMENTS

| 4,208,676 | 6/1980 | Berwick et al. |
| 4,394,681 | 7/1983 | Rowe. |
| 4,729,031 | 3/1988 | Saito et al. |
| 4,809,078 | 2/1989 | Yabe et al. |
| 4,864,390 | 9/1989 | McKechnie et al. |
| 4,875,064 | 10/1989 | Umeda et al. |
| 4,936,658 | 6/1990 | Tanaka et al. |
| 5,005,950 | 4/1991 | Morin. |

FOREIGN PATENT DOCUMENTS

| 192023 | 8/1986 | European Pat. Off. |
| 287034 | 12/1988 | European Pat. Off. |

*Primary Examiner*—Ulysses Weldon
*Attorney, Agent, or Firm*—Nikaido, Marmelstein, Murray & Oram

[57] ABSTRACT

In a liquid crystal projector having a light source and liquid crystal panel units disposed in the optical paths, reflecting means is disposed on the emanating side of the projector for reflecting the light in a direction approximately perpendicular to the optical axis, and change-over means is coupled to the liquid crystal panel units for reversing the lateral directions of images.

7 Claims, 7 Drawing Sheets

FIG.13

LIQUID CRYSTAL PROJECTOR

This is a continuation application Ser. No. 554,761 filed Jul. 20, 1990, now abandoned.

FIELD OF INDUSTRIAL APPLICATION

The present invention relates to a liquid crystal projector for projecting light transmitted through a liquid crystal display panel on a screen for the projection of TV images or reproduction of video images.

BACKGROUND OF THE INVENTION

Liquid crystal projectors have already been proposed in which liquid crystal panels are used (Unexamined Japanese Patent Publication SHO 61-150487.

The proposed projector is so adapted that three kinds of light signals R, B and G subjected to color separation are each passed through a liquid crystal panel for modulation with image data, then superposed and projected by a single projection lens on a screen in front of the lens.

Since the screen must be disposed in front of the projector, a sufficient space is required between the projection lens and the screen in front thereof. However, depending on the shape of the room wherein the projector is to be installed, such a sufficient space is not always available.

Figure 8:
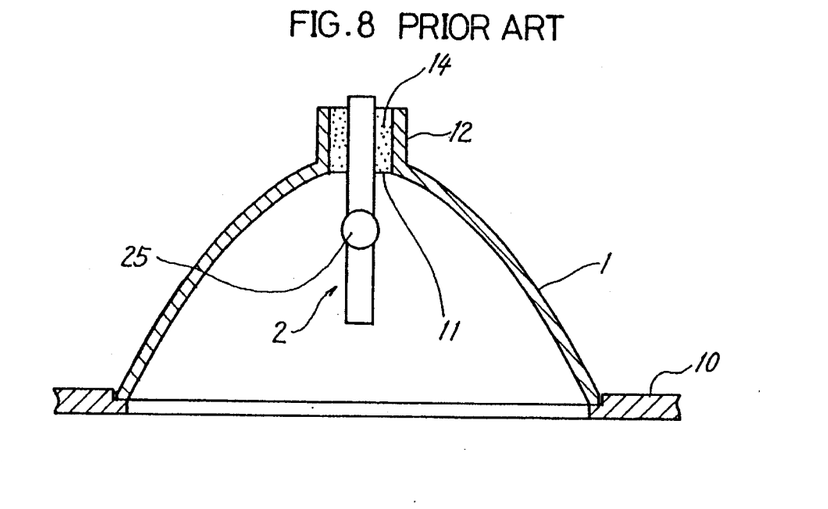
FIG. 8 is a sectional view of a conventional light source.

With reference to FIG. 8, the conventional liquid crystal projector has a light source 2 which comprises a metal halide lamp 25 and which is fixed in a central opening 11 of a parabolic reflector 1 with a ceramic adhesive 14.

Although having high luminance, the metal halide lamp has a shorter life than other lamps and needs to be replaced in about 2000 hours. The replacement of the metal halide lamp has the problem of an increased cost since the lamp is replaced along with the reflector fixedly carrying the lamp.

With respect to the liquid crystal panel which it is desired to operate at a temperature of up to 50° C., polarizing plates, which are arranged in front and rear of the panel, become heated to a temperature 30° C. higher than the atmospheric air, for example, at a polarization ratio of 40%. The heat is transferred to the liquid crystal panel, raising the temperature of the panel to above 50° C. to possibly break the panel.

To obtain a high contrast ratio, the liquid crystal panel usually used is of the normally white type. Liquid crystal panels of this type have a sharp preference angle of field (about 6 degrees), such that the light deviating from this angle results in a markedly reduced contrast ratio.

Figure 11:
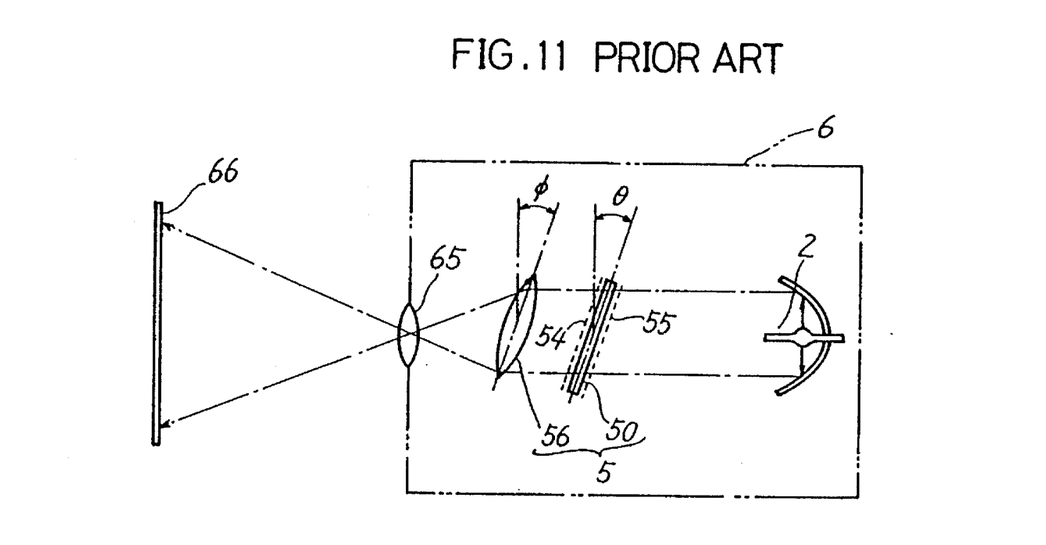
FIG. 11 is a front view schematically showing a liquid crystal projector of the prior art.

As shown in FIG. 11, therefore a liquid crystal unit 5 in the form of an assembly of liquid crystal panel 50, polarizing plates 54, 55 on the incident and emanating sides, and condenser lens 56 is conventionally positioned as inclined at about 6 degrees with respect to a plane perpendicular to the optical axis (Unexamined Japanese Utility Model Publication SHO 64-30978). Nevertheless, the polarizing plates 54, 55 on the incident side and the emanating side satisfactorily serve as a polarizer and an analyzer only when light impinges thereon perpendicular thereto, whereas the polarizing plates in the conventional arrangement are inclined at about 6 degrees with respect to the plane perpendicular to the optical axis and therefore fail to operate properly, consequently producing images of poor contrast.

SUMMARY OF THE INVENTION

An object of the present invention is to provide a liquid crystal projector having a minimized length along the direction of projection and usable in a small space for projection.

Another object of the present invention is to provide a liquid crystal projector which is usable for projecting color images utilizing a space on one side of its projection lens even if no screen space is available in front of the projection lens.

Another object of the present invention is to provide a liquid crystal projector in which the light source lamp alone can be replaced as separated from the reflector and which is therefore usable at a reduced cost.

Another object of the present invention is to provide a liquid crystal projector comprising a liquid crystal panel unit wherein the liquid crystal panel is prevented from a rising temperature and is thereby protected.

Still another object of the present invention is to provide a liquid crystal projector wherein the liquid crystal panel is inclined with respect to the optical axis in corresponding relation with the preference angle of field and which is nevertheless adapted to project images of satisfactory contrast.

DETAILED DESCRIPTION OF THE INVENTION

Figure 1:
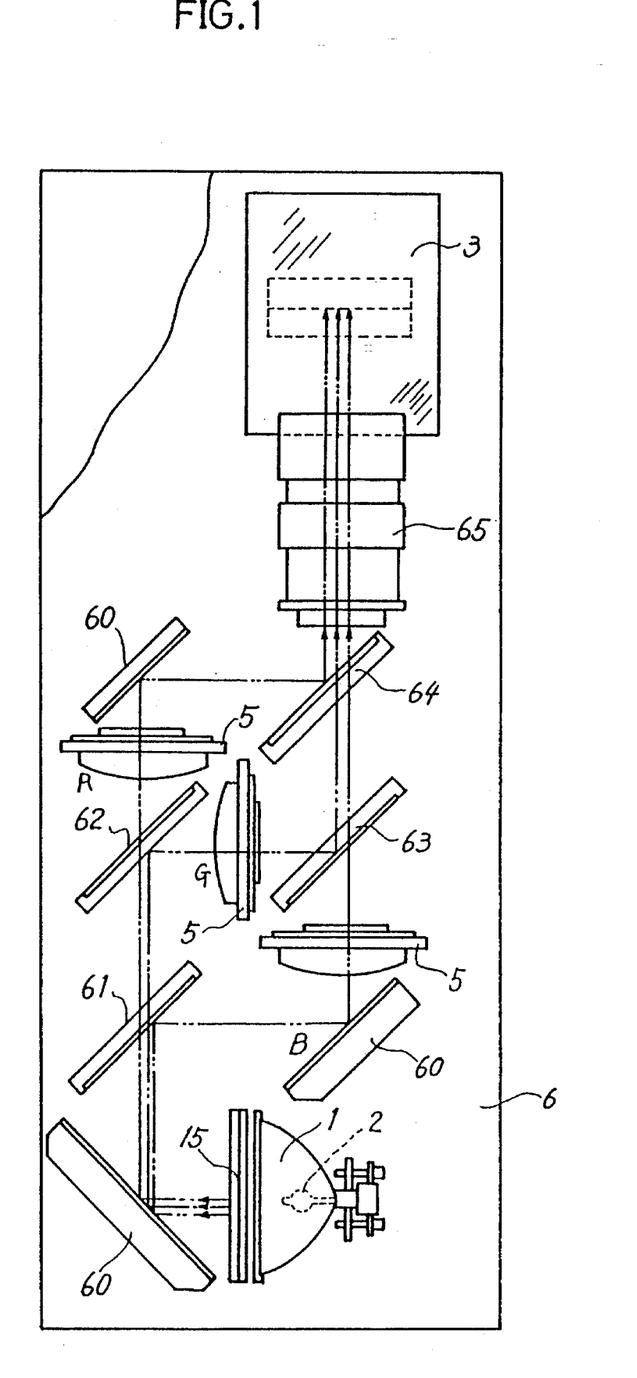
FIG. 1 is a front view of a liquid crystal projector embodying the invention.

With reference to FIG. 1, a flat case 6 houses a light source 2 comprising a metal halide lamp and disposed in a reflector 1. Parallel rays are emitted by the light source 2 through a filter 15 for blocking UV rays.

The parallel rays are reflected at a mirror 60 in front of the light source. The light is then divided into three components of blue, red and green by a dichroic mirror 61 for reflecting blue light only and transmitting other light, and a second dichroic mirror 62 for reflecting green light only. Each of the light components is passed through a liquid crystal panel unit 5 and modulated with an image signal at this time. The modulated beams are passed through third and fourth dichroic mirrors 63, 64, superposed and composed together, and forwarded to a projection lens 65 in front of the mirror 64. The arrangement described above is the same as that of known liquid crystal projectors. According to the invention, however, a reflecting plate 3 inclined at an angle of 45 degrees with the optical axis is disposed in front of the projection lens 65.

The beam emanating from the projection lens 65 has its optical axis deflected at 90 degrees by the reflecting plate 3 and is passed through a front opening 67 of the case 6 and projected on a screen 66 disposed in front of the opening.

Figure 2:
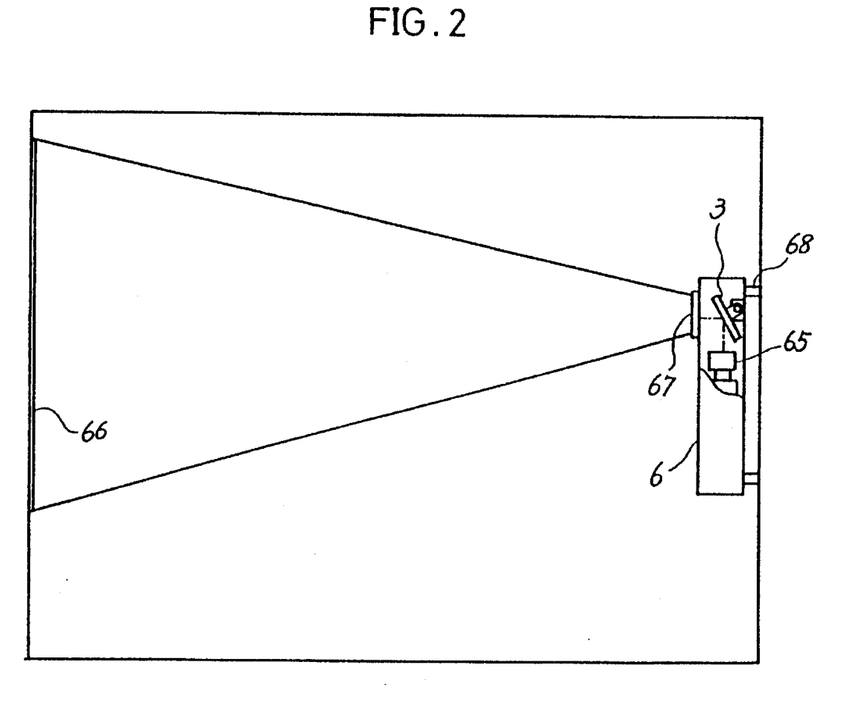
FIG. 2 is a side elevation showing the projector in use.

The case 6 is placed horizontally on a suitable table, or may be hung on a wall behind the case 6 by a bracket 68 as seen in FIG. 2.

Figure 7:
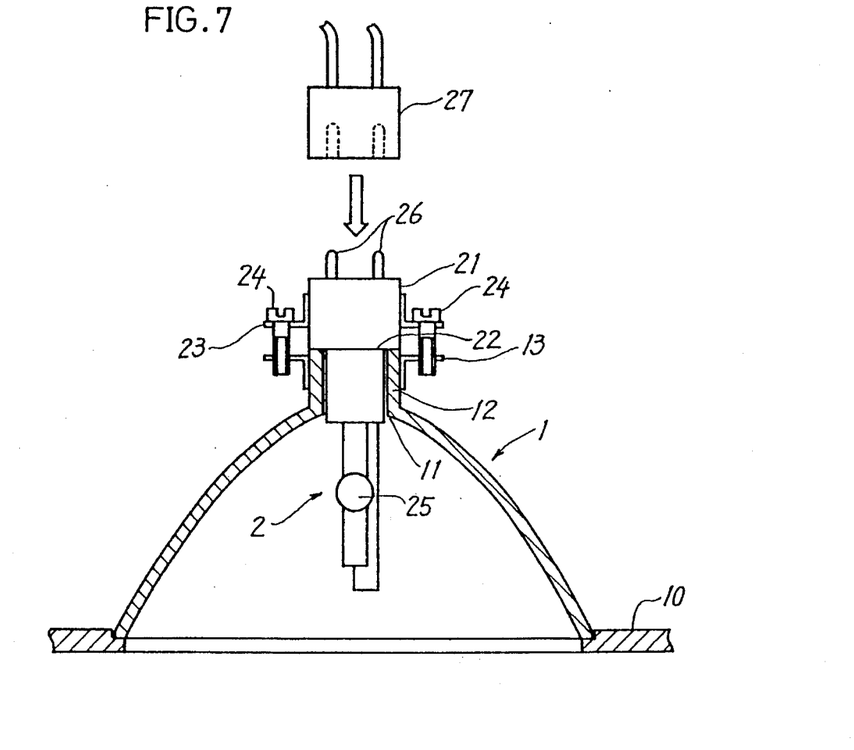
FIG. 7 is a front view partly broken away and showing a light source and a reflector lamp.

As shown in FIG. 7, the light source 2 is removably inserted in an opening 11 of the reflector 1.

The reflector 1 has a bracket 13 projecting outward from a tubular portion 12 thereof defining the opening 11. The light source 2 has an end member 21 which is formed with a stepped portion 22 projecting outward at a specified level from the lamp 25 and has a projecting bracket 23 opposed to the bracket 13 of the reflector 1.

When the lamp 25 is inserted through the opening 11 downward inside the reflector 1 from above the reflector 1, the stepped portion 22 of the end member 21 comes into contact with and is supported by the upper edge of the tubular portion 12, whereby the lamp 25 is positioned at the focal point of the reflector 1 as specified.

The light source 2 is removably fixed to the reflector 1 by tightening up fastening screws 24 inserted through the two brackets 13, 23.

The reflector 1 is fixed to a mount plate 10 in the case 6, and a plug 27 is connected to terminals 26 on the end member 21, whereby the lamp 25 is turned on. When the screws 24 are removed, the light source 2 can be withdrawn alone upward from tile reflector 1 through its opening 11 and is therefore easy to replace. The projector is inexpensive since the reflector 1 is repeatedly usable.

According to the invention, images are projected in a lateral direction at an angle of 90 degrees with a plane containing the optical path from the light source 2 to the projection lens 65, so that the optical mechanical assembly inside the case 6, even if large-sized, produces no influence on the direction of projection on the screen 66. Thus, the length of installation of the projector can be generally as small as the thickness of the case 6, with the result that images can be projected on a large screen even in a small space.

Figure 3:
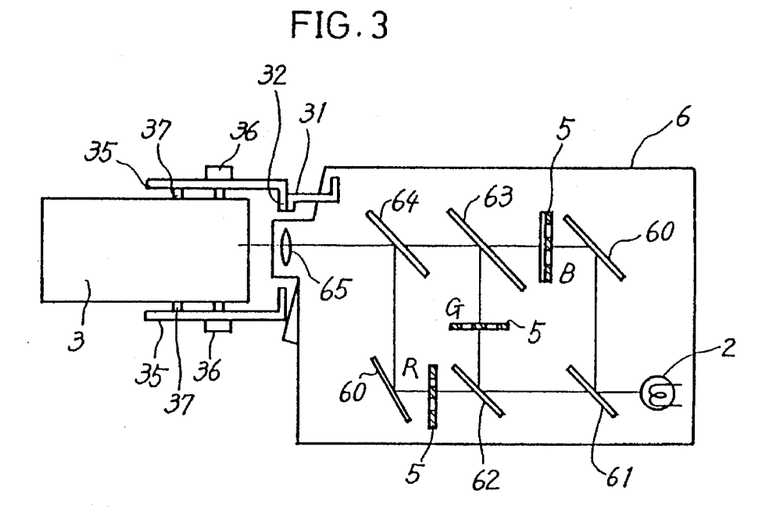
FIG. 3 is a front view of another liquid crystal projector embodying the invention.
Figure 4:
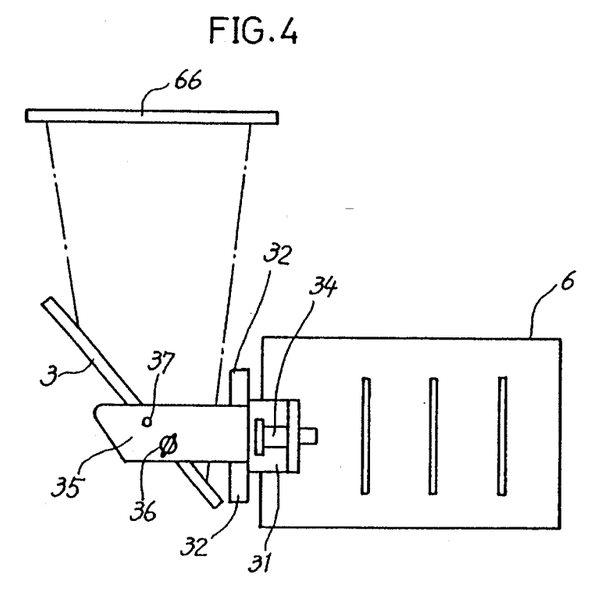
FIG. 4 is a plan view of the projector in use.
Figure 5:
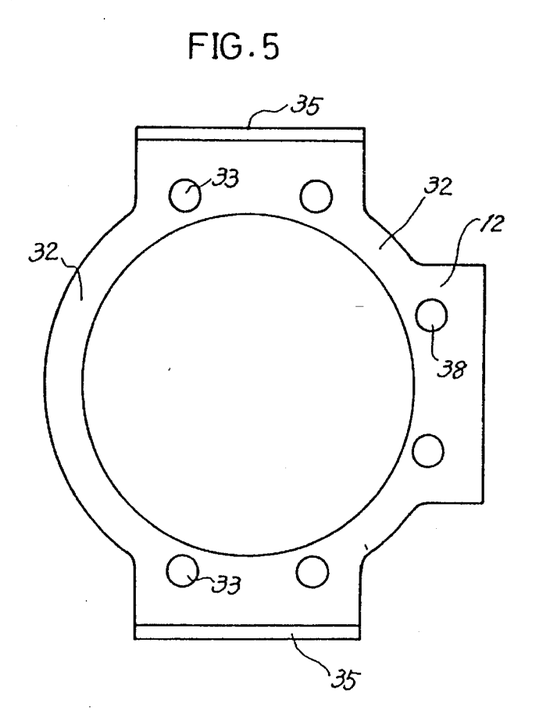
FIG. 5 is a front view of a mount frame for use in the projector.

FIGS. 3 and 4 show another embodiment of the invention, wherein a stay 31 is removably fixed by a fastening screw 34 to the case 6 externally of the projection lens 65. A mount frame 32 shown in FIG. 5 is fixed to the stay 31 with screws (not shown) passed through upper holes 33 formed in the frame 32.

A pair of arm plates 35 extend in parallel from each other from the upper and lower portions of the mount frame 32. A reflecting plate 3 is held between the arm plates and positioned as inclined at an angle of about 45 degrees with the optical aixs. The reflecting plate 3 positioned between the arm plates 35, 35 is supported by upper and lower pivots 37, 37 and is adjustable in angle. The reflecting plate 3 is fixed at the specified angle by setscrews 36, 36 extending from the upper and lower arm plates 35.

The light beam emanating from the projection lens 65 is flexed through an angle of 90 degrees within a horizontal plane by the reflecting plate 3 and projected on a screen 66 disposed at one side of the case 6.

When the screen 66 is disposed on the other side opposite to the position shown in FIG. 4, the mount frame 32 is removed from the stay 31, then turned upside down and attached to the stay 31 again, whereby the beam emanating from the projection lens 65 can be projected toward the other side.

The mount frame 32 is formed with auxiliary attaching holes 38 in a side portion thereof 90 degrees away from the upper or lower arm plate 35 about the center of the frame. The light from the projection lens can be reflected upward or downward at an angle of 90 degrees by removing the mount frame 32 from the stay 31, angularly shifting the frame 32 through 90 degrees and fixing the frame 32 to the stay 31 again using the auxiliary holes 38.

In this case, the screen is provided on the ceiling, viewers lying on bed can watch images projected on the screen on the ceiling.

When a large space is available ahead of the projector of the present embodiment, the mount frame 32 and the stay 31 are removed from the case, and the screen is disposed in front of the projector for projecting images. If the screen space is available at either side of the room or upwardly of the room, the stay 31 is attached to the case 6, and the mount frame 32 is fixed to the stay 31 with the suitable holes 33 or 38 positioned for the stay 31, whereby images can be projected on the screen as provided at either-side or on the ceiling of the room.

When the reflecting plate 3 is disposed in front of the projection lens 65 for reflecting the image beam by the reflecting plate 3, the image becomes reversed sidewise. To correct this, a change-over circuit 4 is provided for control circuits 42 of the liquid crystal panels 5 shown in FIG. 6.

Figure 6:
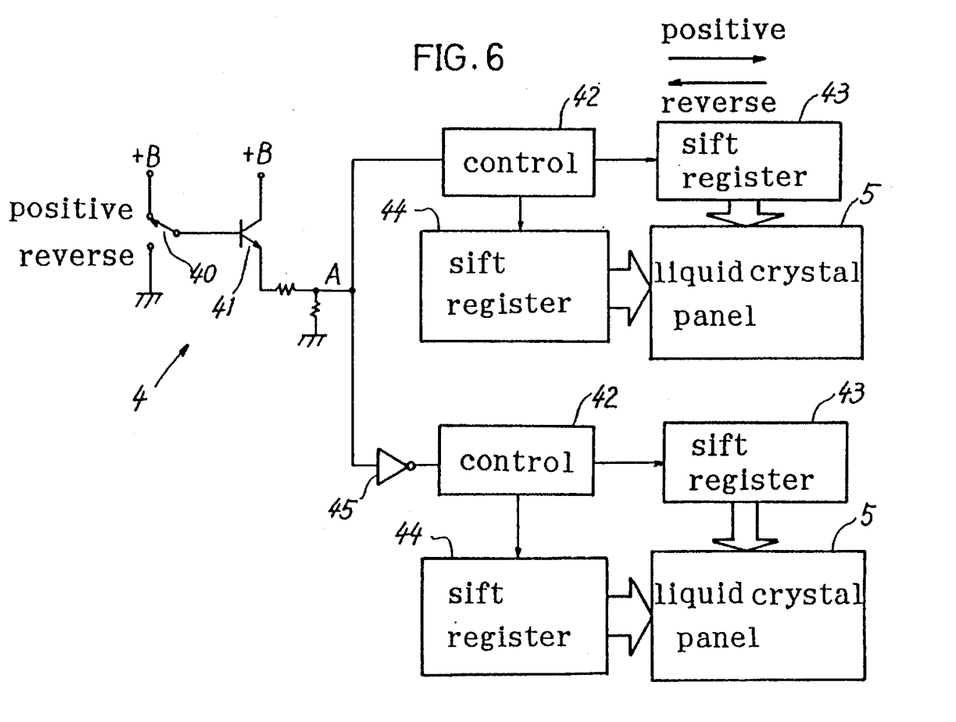
FIG. 6 is a block diagram showing change-over means for the projector.

The liquid crystal panel 50 has 240 lines each comprising 384 pixels, is coupled to a bidirectional shift register 43 in the horizontal direction and a shift register 44 in the vertical direction and is controlled in timing and shift direction by the control circuit 42.

As will be apparent from the arrangement of FIGS. 1 and 3 including the liquid crystal panel units 5, reflecting plate 60, and third and fourth dichroic mirrors 63, 64, the green beam G differs from the red and blue beams R, B in the number of reflections within the case 6. Accordingly, the horizontal drive shift register 43 for the liquid crystal panel 5 for the green beam G is provided with an inverter 45 for reversing the shift direction.

Owing to the provision of the reflecting plate 3, a change-over switch 40 is operated manually or automatically, whereupon a transistor 41 is brought out of conduction to change the potential at point A on the circuit from "H" to "L". The control circuit 42 produces a shift direction reverse signal to reverse the shift direction of the horizontal direction shift register 43.

The potential at point A of the change-over circuit is "H" when the reflecting plate is not provided, or changes to "L" when the reflecting plate is present, so that normal images are projected onto the screen at all times.

Figure 9:
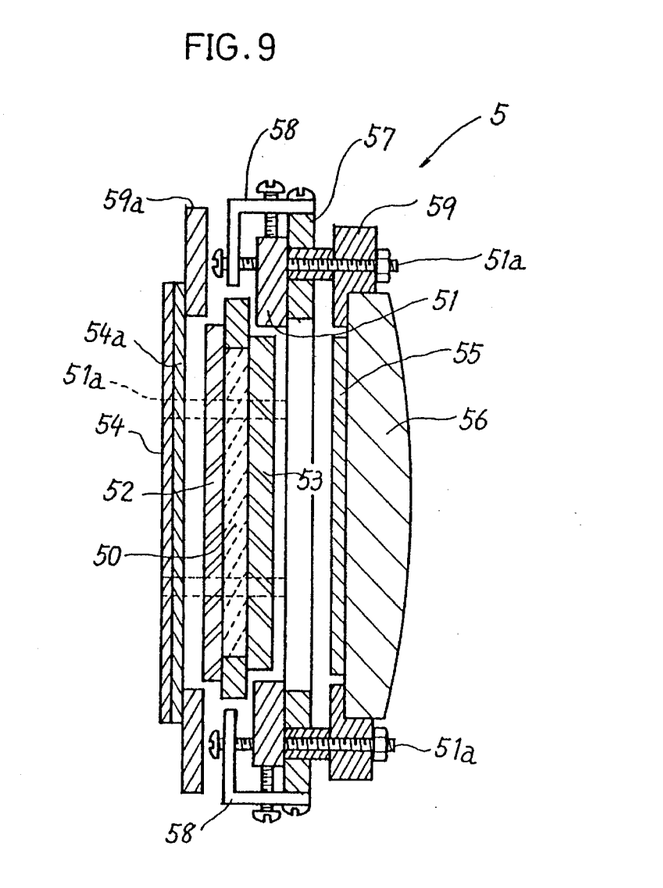
FIG. 9 is a sectional view of a liquid crystal panel unit embodying the invention.

With reference to FIG. 9 showing the liquid crystal panel unit 5, a polarizing plate 55 on the incident side is affixed to the rear surface of a condenser lens 56 with a transparent silicon adhesive, and the lens is bonded to a heat release frame 59 with a thermally conductive adhesive.

A mount frame 51 has a post 51a projecting from each of its four corners and supporting a liquid crystal panel carrying frame 57, with a spacer provided therebetween. The heat release frame 59 bears on the outer end of the spacer and is fixed to the post with a nut. The panel carrying frame 57 is held between the mount frame 51 and the heat release frame 59 slightly movably.

A polarizing plate 54 on the emanating side is affixed to a glass substrate 54a, which is bonded to a heat release frame 59a with a thermally conductive silicon adhesive.

A liquid crystal panel 50 has heat release glass plates 52, 53 affixed to the respective surfaces thereof with transparent silicon adhesive and is thereby prevented from rise of temperature.

The liquid crystal panel 50 and the heat release frame 59a are supported on opposite sides of the mount frame 51.

The panel carrying frame 57 is provided on its upper, lower and lateral sides with adjusting mechanisms 58, by which the position of the mount frame 51 is adjusted relative to the panel carrying frame 57 for adjusting the convergence of the composed beam.

Figure 10:
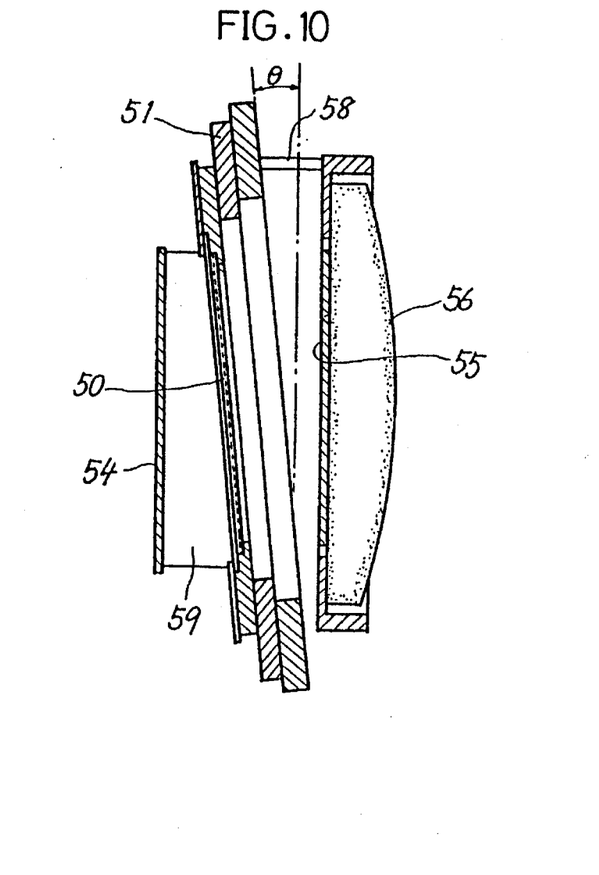
FIG. 10 is a sectional view of another liquid crystal panel unit embodying the invention.

FIG. 10 shows another liquid crystal panel unit embodying the invention. With this embodiment, a liquid crystal panel 50 is positioned as inclined at an angle θ corresponding to the preference angle of field, and stays 58, 59 are arranged on the front and rear sides of a mount frame 51 to position a condenser lens 56 and front and rear polarizing plates 55, 54 approximately perpendicular to the optical axis.

Figure 12:
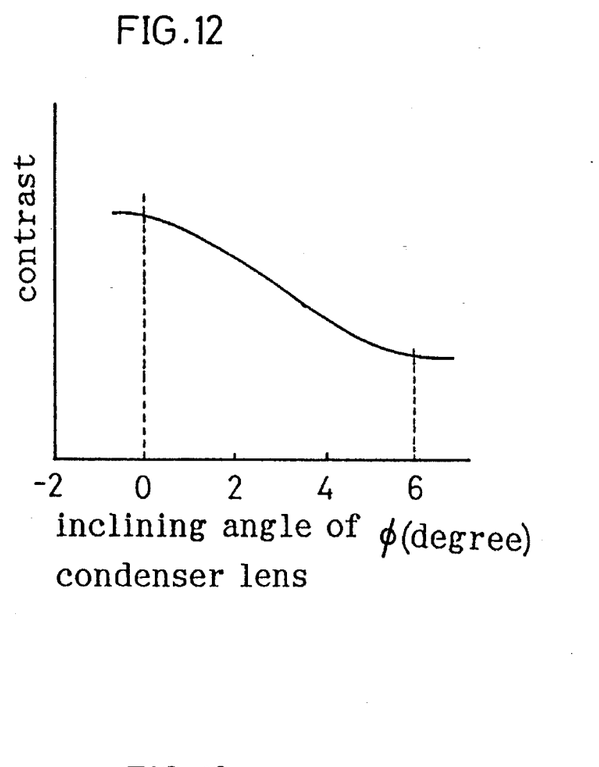
FIGS. 12 and 13 are graphs showing the relationship between the contrast and the inclining angle of condenser lens or liquid crystal panel.

The present invention is characterized in that the liquid crystal panel 50 of each liquid crystal panel unit 5 is inclined in accordance with the preference angle of field as already known, and that the condenser lens 56 is positioned perpendicular to the optical axis. With reference to FIG. 12, the inclining angle θ of the condenser lens 56 together with a polarizing plate 55 was altered with each liquid crystal panel 50 inclined at an angle corresponding to the preference angle of field to determine the resulting variations in contrast. As the characteristics curve of FIG. 12 shows, the applicant found that the contrast can be improved as the inclining angle θ approaches 0 degree from the preference angle of field of 3 to 6 degrees.

Figure 13:
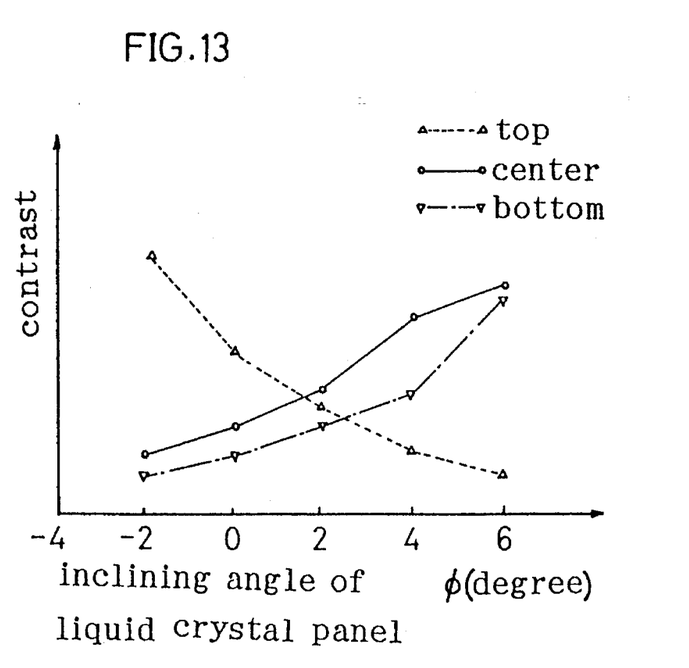

The applicant further altered the inclining angle θ of the liquid crystal panel 50 with the condenser lens 56 positioned perpendicular to the optical axis to check the resulting variations in contrast on the screen as divided into the top, center and bottom areas.

The result is shown in FIG. 13, which reveals that in the top area of the screen, the contrast decreases as the inclining angle θ of the liquid crystal panel increases but that in the center and bottom areas, the increase in the angle conversely improves the contrast.

Since the contrast in the center area of the screen is generally regarded as important, it is desirable that the inclining angle θ of the liquid crystal panel 50 be set to 6 degrees. However, the applicant has found that as the inclining angle θ of the liquid crystal panel approaches 6 degrees beyond 3 degrees, the top or center area of the screen locally fades and becomes whitish in the case where the projected image is solid black. Accordingly, the optimum inclining angle of the liquid crystal panel is preferably about 3 degrees in order to ensure both improved contrast and prevention of fading.

The polarizing plate 54 disposed on the emanating side of each liquid crystal panel, when inclined at the same angle as the liquid crystal panel 50, also produces approximately the same effect.

The problem of fading is thought to be closely related to the heat release efficiency of the liquid crystal panel. If this problem can be obviated by forced cooling of the liquid crystal panel, the liquid crystal panel can also be inclined, for example, at an angle of 6 degrees.

The change-over means for laterally reversing the image, when the reflecting plate 3 is used is not limited to the electric means for the shift register 43 but also includes means for optically reversing the image with use of a mirror or prism.

The present invention is not limited by the drawings or the foregoing description but can be modified or altered variously by one skilled in the art within the scope defined in the appended claims. Such modifications or alterations are therefore included within the scope of the invention as defined in the claims.

What is claimed is:

1. A liquid crystal projector comprising:
   a light source;
   separating means for separating light from the light source into three light components;
   liquid crystal panel units disposed in respective optical paths for the three light components separated by the light separating means, each of the liquid crystal panel units to modulate the light component in accordance with image data, each of the liquid crystal panel units including
   a) a liquid crystal panel disposed as inclined at a predetermined angle with a plane perpendicular to an optical path in accordance with a preference angle of field,
   b) a condenser lens, and
   c) an incident-side polarizing plate, said incident-side polarizing plate is arranged perpendicular to the optical path; and
   optically composing means for optically composing the three light components as transmitted through the liquid crystal panel units.

2. A liquid crystal projector as defined in claim 1, wherein the predetermined angle of inclination of the liquid crystal panel is about 3 degrees.

3. A liquid crystal projector as defined in claim 1, wherein the condenser lens is arranged perpendicular to the optical path.

4. A liquid crystal projector as defined in claim 3, wherein the polarizing plate on an incident side is affixed to a rear surface of the condenser lens with a transparent silicon adhesive.

5. A liquid crystal projector as defined in claim 1, wherein on an emanating side of the optical composing means, a reflecting means is disposed for reflecting light composed by the optical composing means in a direction approximately perpendicular to an optical axis of the optical composing means; and change-over means is coupled to each of the liquid crystal panel units for reversing a lateral direction of images in the liquid crystal panel units.

6. A liquid crystal projector as defined in claim 5 wherein the reflecting means is removable, and the change-over means is on-off controllable.

7. A liquid crystal projector as defined in claim 1 wherein the light source is insertable inside a generally parabolic reflector through an opening formed in the reflector centrally thereof, and the light source comprises an end member having an outwardly projecting stepped portion and removably attachable to the reflector with the stepped portion in bearing contact with the opening end of the reflector, and a lamp connected to the end member and having a light-emitting portion positioned at the focal point of the reflector.

\* \* \* \* \*